(12) United States Patent
Hata et al.

(10) Patent No.: US 8,811,626 B2
(45) Date of Patent: Aug. 19, 2014

(54) RECORDING/REPRODUCING APPARATUS

(75) Inventors: Toshiyuki Hata, Hamamatsu (JP); Eiko Kobayashi, Hamamatsu (JP)

(73) Assignee: Yamaha Corporation (JP)

( * ) Notice: Subject to any disclaimer, the term of this patent is extended or adjusted under 35 U.S.C. 154(b) by 261 days.

(21) Appl. No.: 13/059,191

(22) PCT Filed: Aug. 21, 2009

(86) PCT No.: PCT/JP2009/004036
§ 371 (c)(1),
(2), (4) Date: Feb. 15, 2011

(87) PCT Pub. No.: WO2010/021154
PCT Pub. Date: Feb. 25, 2010

(65) Prior Publication Data
US 2011/0142253 A1    Jun. 16, 2011

(30) Foreign Application Priority Data

Aug. 22, 2008 (JP) ................................. 2008-213668
Aug. 20, 2009 (JP) ................................. 2009-191242

(51) Int. Cl.
*H04R 3/00* (2006.01)
*G11B 20/10* (2006.01)
*G11B 27/10* (2006.01)
*H04R 1/40* (2006.01)
*G11B 27/034* (2006.01)

(52) U.S. Cl.
CPC .......... *G11B 20/10527* (2013.01); *H04R 3/005* (2013.01); *G11B 27/105* (2013.01); *H04R 1/406* (2013.01); *G11B 2020/10601* (2013.01); *G11B 27/034* (2013.01)
USPC ................ 381/92; 381/91; 381/94.1; 381/26; 381/122

(58) Field of Classification Search
CPC .......... H04R 3/005; H04R 1/405; H04R 3/00; H04R 25/407; H04R 2201/401; H04R 1/08; H04R 5/027; H04R 2430/20; H04R 2499/11; H04R 2201/403; G10L 21/0208; G10L 2021/02166
USPC ............... 381/92, 91, 94.1, 26, 122
See application file for complete search history.

(56) References Cited

U.S. PATENT DOCUMENTS

| | | | |
|---|---|---|---|
| 2005/0207591 A1* | 9/2005 | Tsuji et al. ....................... | 381/92 |
| 2006/0045289 A1* | 3/2006 | Kujirai et al. .................... | 381/92 |
| 2008/0044033 A1* | 2/2008 | Ozawa ........................... | 381/26 |

FOREIGN PATENT DOCUMENTS

CN         1638532 A       7/2005
(Continued)

OTHER PUBLICATIONS

Extended European Search Report issued in corresponding European patent application No. 09808090.6 dated Oct. 31, 2011.
(Continued)

*Primary Examiner* — Vivian Chin
*Assistant Examiner* — Paul Kim
(74) *Attorney, Agent, or Firm* — Rossi, Kimms & McDowell LLP

(57) ABSTRACT

A recording/reproducing apparatus includes a plurality of unidirectional microphones and a plurality of direction indicator switches. The unidirectional microphones are each disposed in the periphery with a predetermined angle interval therebetween, whereas the direction indicator switches are able to indicate other directions other than a plurality of directions corresponding to the unidirectional microphones. In a normal reproducing mode, a plurality of audio signals which are picked up by the unidirectional microphones and subsequently recorded is read and reproduced in parallel. When any one of the direction indicator switches is operated, only the audio signal emitted in the designated direction is selectively read and reproduced. When another direction other than a plurality of directions corresponding to the unidirectional microphones is designated, audio signals picked up by two unidirectional microphones which are disposed to sandwich the designated direction is selectively read and reproduced.

4 Claims, 7 Drawing Sheets

(56) References Cited

FOREIGN PATENT DOCUMENTS

| | | |
|---|---|---|
| CN | 1956601 A | 5/2007 |
| CN | 101242677 A | 8/2008 |
| EP | 0869697 A2 | 10/1998 |
| EP | 1711003 A2 | 10/2006 |
| EP | 1892994 A2 | 2/2008 |
| JP | 2001-296343 A | 10/2001 |
| JP | 2002-050161 A | 2/2002 |
| JP | 2002232988 A | 8/2002 |
| JP | 2003-60792 A | 2/2003 |
| JP | 2004-180197 A | 6/2004 |
| JP | 2005-184386 A | 7/2005 |
| JP | 2005217749 A | 8/2005 |
| JP | 2007-256498 A | 10/2007 |
| JP | 2007-318438 A | 12/2007 |

OTHER PUBLICATIONS

"Brilliant Stereo Recording", Zoom Corporation, Jul. 31, 2007, XP002661636. www.zoom.co.jp/download/H2_E.pdf Cited in corresponding EP appln. No. 09808090.6 in Extended Search Report dated Oct. 31, 2011.

Nelson, Mark "Review: Zoom H2 Handheld Surround Recorder", O'Reilly Digitalmedia, Sep. 13, 2007, XP002661637. http://digitalmedia.oreilly.com/2007/09/13/review-zoom-h2-surround-recorder.html Cited in corresponding EP appln. No. 09808090.6 in Extended Search Report dated Oct. 31, 2011.

International Search Report issued in corresponding Japanese Patent Application No. PCT/JP2009/004036 dated Sep. 15, 2009.

Chinese office action issued in Chinese counterpart application No. CN200980132457.5, dated Mar. 5, 2013. English translation provided.

Notification of the Second Office Action for corresponding CN 200980132457.5, mail date Oct. 31, 2013. English translation provided.

* cited by examiner

RECORDING/REPRODUCING APPARATUS

This application is a U.S. National Phase Application of PCT International Application PCT/JP2009/004036 filed on Aug. 21, 2009 which is based on and claims priority from JP 2008-213668 filed on Aug. 22, 2008 and JP 2009-191242 filed on Aug. 20, 2009, the contents of each of which are incorporated herein by reference in their entirety.

TECHNICAL FIELD

The present invention relates to recording/reproducing apparatuses that collect sounds, which are emitted in multiple directions by a plurality of people participating in meetings, so as to record and/or reproduce sounds.

The present application claims priority on Japanese Patent Application No. 2008-213668 filed in Japan on Aug. 22, 2008 and Japanese Patent Application Publication No. 2009-191242 filed in Japan on Aug. 20, 2009, the contents of which are incorporated herein by reference.

BACKGROUND ART

Generally, sounds produced by a plurality of people participating in meetings are recorded, thereafter, the contents thereof are confirmed upon reproducing sounds; hence, a variety of recording/reproducing apparatuses and technologies such as Patent Document 1, have been developed. When a plurality of attendees participated in a meeting is speaking from their seated positions, a plurality of sounds is picked up using a plurality of microphones and recorded on a plurality of tracks (or channels) of multi-track digital recording/reproducing apparatuses (or multichannel digital recorders) such as one disclosed in Patent Document 1.

When the aforementioned recording/reproducing apparatuses reproduce recorded sounds after completion of meetings, operators do not need to listen to all the recorded sounds in time series but need to confirm only the statements of specific attendees in meetings. In the aforementioned recording/reproducing apparatuses, it is difficult to specify the tracks recording the statements of specific attendees in meetings and it is also difficult to grasp them by intuition. For this reason, operators need to search for the tracks recording the statements of specific attendees in meetings by reproducing sounds recorded on tracks one by one, which is troublesome.

PRIOR ART DOCUMENT

Patent Document

Patent Document 1: Japanese Patent Application Publication No. 2002-050161
Patent Document 2: Japanese Patent Application Publication No. 2007-256498

SUMMARY OF THE INVENTION

Problem to be Solved by the Invention

A problem to be solved is that an operator (or a user) of a recording/reproducing apparatus is unable to specify the reproduce tracks (or reproduce channels) by intuition based on the seated positions of attendees in meetings.

Means for Solving the Problem

A recording/reproducing apparatus of the present invention includes a plurality of unidirectional microphones and a plurality of direction indicator switches. In Embodiment 1, direction indicator switches are aligned on the housing, whilst unidirectional microphones are arranged in a sound collector disposed on the housing. In Embodiment 2, two arms are connected to the housing in a rotationally-adjustable manner, wherein they are each equipped with a unidirectional microphone and a direction indicator switch. In addition, direction indicator switches are able to indicate a plurality of directions designated by unidirectional microphones as well as other directions.

In a normal reproducing mode, a plurality of audio signals which are collected by unidirectional microphones is read in parallel and reproduced. When any one of direction indicator switches is operated, only the audio signal corresponding to the designated direction is selectively read and reproduced. When a direction other than a plurality of directions designated by unidirectional microphones is designated, audio signals picked up by two unidirectional microphones sandwiching the designated direction are selectively read and reproduced.

When a recording/reproducing apparatus of the present invention is adapted to a meeting to record its content, the recording/reproducing apparatus is disposed at the center of a conference table at which attendees of the meeting are seated, for example, so that the statements of attendees are subjected to multi-channel recording in parallel.

In a normal reproducing mode in which no direction indicator switch is operated, a plurality of audio signals subjected to multichannel recording is read and reproduced in parallel. When any one of the direction indicator switches is operated, only the audio signal corresponding to the designated direction is read and reproduced. That is, the user of the recording/reproducing apparatus is able to extract only the statement of a desired attendee in a meeting and confirm it upon reproduction by simply designating a specific direction.

When a recording/reproducing apparatus is adjusted in a setup direction so that unidirectional microphones are disposed to set their directivities towards attendees in a meeting in advance, the user is able to grasp the directions corresponding to specific attendees by intuition after completion of the recording of a meeting. In other words, upon setting the positional relationship between a recording/reproducing apparatus and a seating order of attendees in a meeting, the user is able to easily extract and reproduce only the statement of a specific attendee by operating a direction indicator switch. This eliminates a troublesome operation for selecting recording channels needed by the prior art.

In addition, it is possible to designate a large number of directions with a small number of unidirectional microphones; this simplifies the constitution of a recording/reproducing apparatus and improves the usability thereof.

In this connection, when a recording/reproducing apparatus is constituted of the housing and arms and equipped with angle sensors for detecting angles between the housing and the rotationally-adjustable arms, it is possible to compare angles of arms of a recording mode and angles of arms of a reproducing mode. In this case, when an angle of the recording mode matches an angle of the reproducing mode, a recording/reproducing operation is performed as described above, whereas when they do not match each other, it is possible to produce an alarm sound notifying the user of an inconsistency of angles.

Effect of the Invention

A recording/reproducing apparatus of the present invention demonstrates the following effects.

When a recording/reproducing apparatus is adapted to a meeting, unidirectional microphones are disposed to set their directivities towards attendees, thus allowing the user to grasp the direction of a specific attendee by intuition.

Since direction indicator switches are able to designate directions whose number is larger than the number of unidirectional microphones, it is possible to pick up sound in an intermediate direction between the directions of two unidirectional microphones.

The alignment of unidirectional microphones in the recording/reproducing apparatus is not necessarily fixed, thus making it possible to adjust the directions of unidirectional microphones by adjusting angles of rotationally-adjustable arms. This makes it possible to assume a desired sound collection range and to adapt the recording/reproducing apparatus to various meetings.

Upon adjusting the positional relationship between unidirectional microphones of a recording/reproducing apparatus and a seating order of attendees in a meeting in advance, the user is able to extract and reproduce the statement of an attendee corresponding to a desired direction by simply operating a direction indicator switch; this does not need a troublesome operation for selecting recording channels.

MODE FOR CARRYING OUT THE INVENTION

Embodiment 1

Figure 1:
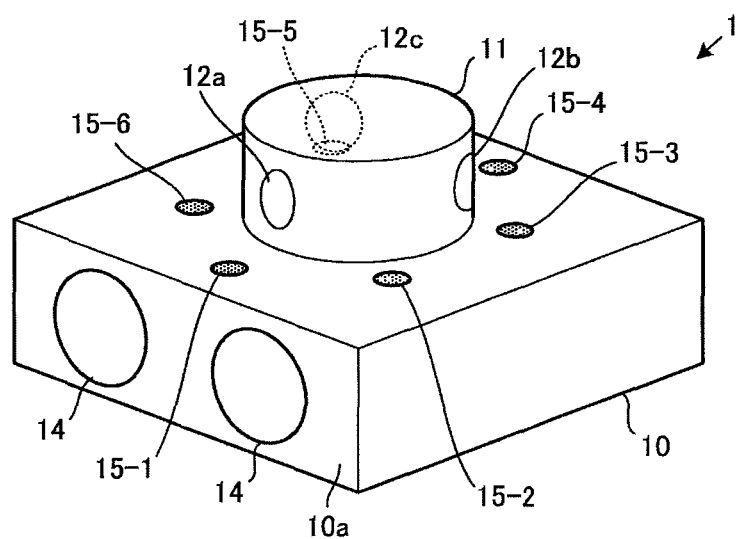
FIG. 1 A perspective view showing the exterior appearance of a recording/reproducing apparatus according to Embodiment 1 of the present invention.
Figure 2:
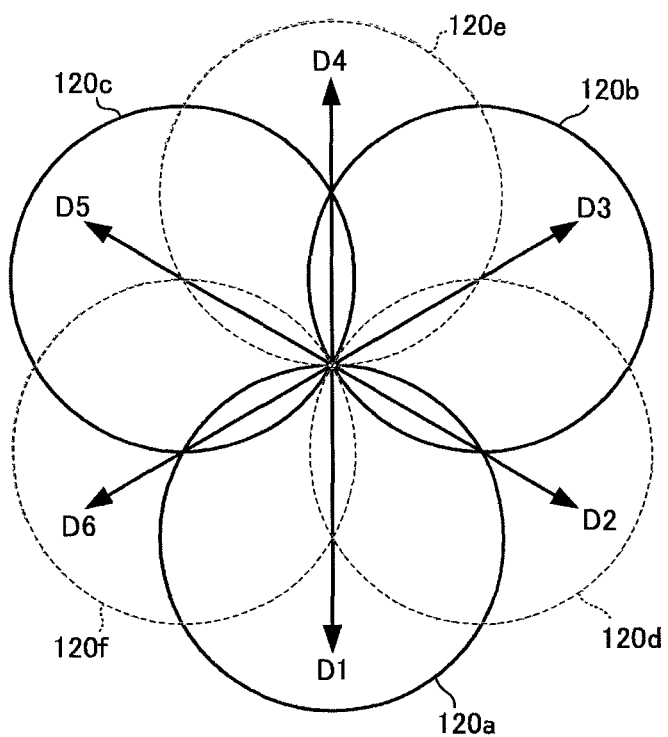
FIG. 2 A plan view showing directivity characteristics and their directions realized by three microphones installed in the recording/reproducing apparatus of Embodiment 1.

FIG. 1 is a perspective view showing the exterior appearance of a recording/reproducing apparatus according to Embodiment 1 of the present invention. FIG. 2 is an illustration showing the directivity characteristics of microphones 12 (12a, 12b, 12c) installed in a recording/reproducing apparatus 1.

The recording/reproducing apparatus 1 has a housing 10 of a rectangular parallelepiped shape having a low height, wherein a sound collector 11 having a cylindrical shape is disposed at the center of an upper surface of the housing 10. Speakers 14 are arranged on one side face 10a among four side faces of the housing 10. In the following description, the direction of the side face 10a arranging the speakers 14 will be referred to as a front direction.

The three microphones 12a, 12b, 12c are attached to the side face of the sound collector 11 with angular intervals of 120 degrees therebetween. Specifically, the microphone 12a is disposed in the front direction of the sound collector 11; the microphone 12b is disposed rightwards by 120 degrees from the front direction; and the microphone 12c is disposed leftwards by 120 degrees from the front direction. The microphones 12a, 12b, 12c are unidirectional microphones which are each disposed in a direction perpendicular to the center axis of the sound collector 11 (or a normal direction), wherein they have the directivity characteristics designated by solid-circles 120a, 120b, 120c in FIG. 2. Specifically, the solid-circle 120a indicates the directivity characteristic of the microphone 12a; the solid-circle 120b indicates the directivity characteristic of the microphone 12b; and the solid-circle 120c indicates the directivity characteristic of the microphone 12c. As shown in FIG. 2, the microphones 12a, 12b, 12c have maximum sensitivities in their microphone directivities, wherein the sensitivity decreases as an angle deviated from the microphone directivity increases, so that the sensitivity becomes zero in a horizontal direction of the microphone directivity (i.e. a direction whose angle is 90 degrees deviated from the microphone sensitivity).

An audio signal of the microphone 12a and an audio signal of the microphone 12b are added together so as to reproduce sound with the intermediate directivity characteristic denoted by a dotted-circle 120d shown in FIG. 2. Similarly, an audio signal of the microphone 12b and an audio signal of the microphone 12c are added together so as to reproduce sound with the intermediate directivity characteristic denoted by a dotted-circle 120e. In addition, an audio signal of the microphone 12c and an audio signal of the microphone 12a are added together so as to reproduce sound with the intermediate directivity characteristic denoted by a dotted-circle 120f. In Embodiment 1, the three unidirectional microphones 12a, 12b, 12c are arranged with an angle interval of 120 degrees therebetween, whereby it is possible to collect sound in all peripheral directions around the sound collector 11.

In a counterclockwise direction in FIG. 2, D1 denotes the direction of the directivity characteristic 120a; D2 denotes the direction of the directivity characteristic 120d; D3 denotes the direction of the directivity characteristic 120b; D4 denotes the direction of the directivity characteristic 120e; D5 denotes the direction of the directivity characteristic 120c; and D6 denotes the direction of the directivity characteristic 120f.

In FIG. 1, direction indicator switches (i.e. push button switches) 15 (15-1 through 15-6) are arranged on the upper surface of the housing 10 in the directions D1 through D6 around the sound collector 11. Herein, the direction indicator switch 15-1 indicates the direction D1; the direction indicator switch 15-2 indicates the direction D2; the direction indicator switch 15-3 indicates the direction D3; the direction indicator switch 15-4 indicates the direction D4; the direction indictor switch 15-5 indicates the direction D5; and the direction indicator switch 15-6 indicates the direction D6. For the purpose of reproducing sound recorded on the recording/reproducing apparatus 1, when the user operates one of the direction indicator switches 15-1 through 15-6 so as to designate one of the directions D1 through D6, only the sound incoming in the designated direction is selectively reproduced.

The recording/reproducing apparatus 1 shown in FIG. 1 does not illustrate the detailed constitution, but it further includes various recording/reproducing-related operators other than the direction indicator switches 15-1 through 15-6, for example, a recording start switch, a recording end switch, a recording suspend switch, a play switch, a play suspend switch, a play stop switch, and a rewind/forward switch. In addition, the recording/reproducing apparatus 1 can be accompanied with a remote control unit, which is equipped with recording/reproducing-related operators.

Figure 3:
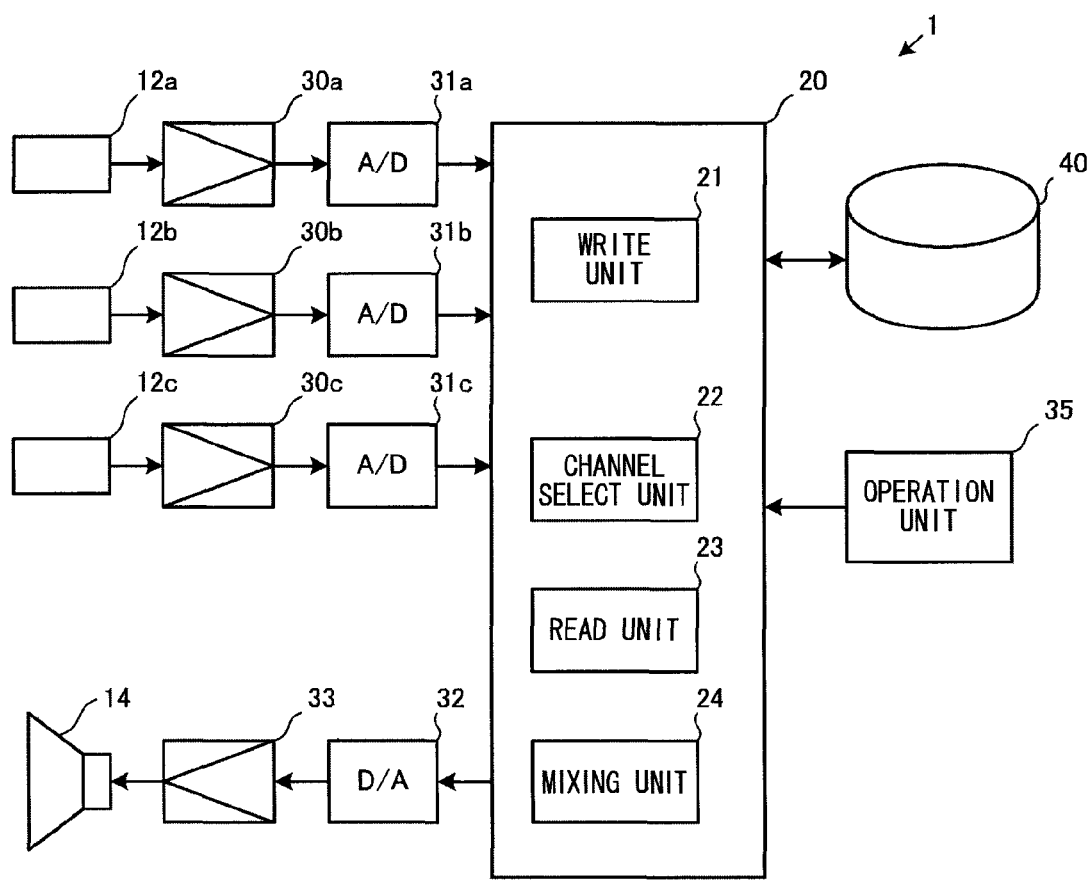
FIG. 3 A block diagram showing the constitution of the recording/reproducing apparatus of Embodiment 1.

FIG. 3 is a block diagram showing the constitution of the recording/reproducing apparatus 1. The microphones 12a, 12b, 12c are connected to amplifiers 30a, 30b, 30c and A/D converters 31a, 31b, 31c respectively. The amplifiers 30a, 30b, 30c amplify audio signals of the microphones 12a, 12b, 12c; subsequently, the A/D converters 31a, 31b, 31c convert amplified audio signals into digital signals, which are output to a control unit 20.

The control unit 20 is configured of a microcomputer, which realizes various functions upon executing predetermined programs. The control unit 20 includes four functional blocks, namely a write unit 21, a channel select unit 22, a read unit 23, and a mixing unit 24. The functional blocks will be described in detail as follows.

The control unit 20 is connected to an operation unit 35 including the direction indicator switches 15-1 through 15-6 as well as recording/reproducing-related operators, a recording unit 40 which is a large-scale storage unit consisting of a hard-disk unit or a flash memory, and a D/A converter 32. The recording unit 40 records audio signals picked up by the microphones 12a, 12b, 12c. The D/A converter 32 is connected to an analog audio amplifier 33. The analog audio amplifier 33 is connected to the speaker disposed on the side face 10a of the recording/reproducing apparatus 1 in the front direction. The recording/reproducing apparatus 1 provides a single reproducing system constituted of the speakers 14 in connection with three recording systems constituted of the three microphones 12a, 12b, 12c.

In a recording mode, the write unit 21 records three digital signals output from the A/D converters 31a, 31b, 31c on three channels of the recording unit 40.

In the recording unit 40 of the recording/reproducing apparatus 1, an audio signal of the microphone 12a is recorded on a channel CH1; an audio signal of the microphone 12b is recorded on a channel CH2; and an audio signal of the microphone 12c is recorded on a channel CH3.

The channel select unit 22 selects a read channel of the recording unit 40 so as to issue a read instruction to the read unit 23. In a normal reproducing mode in which the user does not operate the direction indicator switches 15-1 through 15-6, the channel select unit 22 selects all the channels CH1 through CH3. In a direction-designated reproducing mode in which the user operates one of the direction indicator switches 15-1 through 15-6, the channel select unit 22 selects a channel recording sound incoming in the designated direction. When the user operates the direction indicator switch 15-1 to designate the direction D1, for example, the channel select unit 22 selects the channel CH1 recording an audio signal picked up by the microphone 12a. When the user operates the direction indicator switch 15-2 to designate the direction D2, the channel select unit 22 selects the channels CH1 and CH2 recording audio signals picked up by the microphones 12a and 12b.

The read unit 23 reads a digital audio signal, recorded on the channel selected by the channel select unit 22, from the recording unit 40, thus supplying it to the mixing unit 24. When the read unit 23 reads a digital audio signal of one channel from the recording unit 40, the mixing unit 24 directly supplies the digital audio signal to the D/A converter 32. When the read unit 23 reads a plurality of digital audio signals, corresponding to two channels or three channels, from the recording unit 40, the mixing unit 24 mixes digital audio signals, thus supplying a mixed digital audio signal to the D/A converter 32. The D/A converter 32 converts digital audio signals, supplied from the mixing unit 24, into analog audio signals, which are supplied to the audio amplifier 33. The audio amplifier 33 amplifies analog audio signals and supplies them to the speaker 14, thus producing sounds.

When the recording/reproducing apparatus 1 is adapted to the recording of a meeting, the recording/reproducing apparatus 1 is arranged at the center position among a plurality of attendees, wherein the user operates a recording switch. Thus, the recording/reproducing apparatus 1 records the statement of attendees in a meeting on the three channels CH1 through CH3 in the recording unit 40.

In a normal reproducing mode for reproducing sound recoded on the recording unit 40, the user operates a play switch so that the recording/reproducing apparatus 1 simultaneously reads a plurality of audio signals recorded on the three channels CH1 through CH3 and subsequently mixes on audio signals, thus reproducing them. That is, when the user does not operate the direction indicator switches 15-1 through 15-6 and thereby does not designate any direction, a plurality of audio signals recorded on the three channels CH1 through CH3 of the recording unit 40 is read in parallel, so that incoming sounds in the perimeter of the sound collector 11 are reproduced with the same level. When the user designates one of the direction indicator switches 15-1 through 15-6, the recording/reproducing apparatus 1 reads only the sound, incoming in the designated direction, from the counterpart channel of the recording unit 40, thus reproducing it. Thus, only the statement of an attendee seated in the designated direction among a plurality of attendees participated in a meeting is selectively read and reproduced.

The user needs to recall a seating order of attendees in a meeting and operate the direction indicator switches 15-1 through 15-6, thus selectively reproducing the statements of attendees. In other words, the user is allowed to operate one of the direction indicator switches 15-1 through 15-6, commensurate with a desired direction, based on a seating order of attendees in a meeting, thus selecting a reproducing direction.

Figure 4:
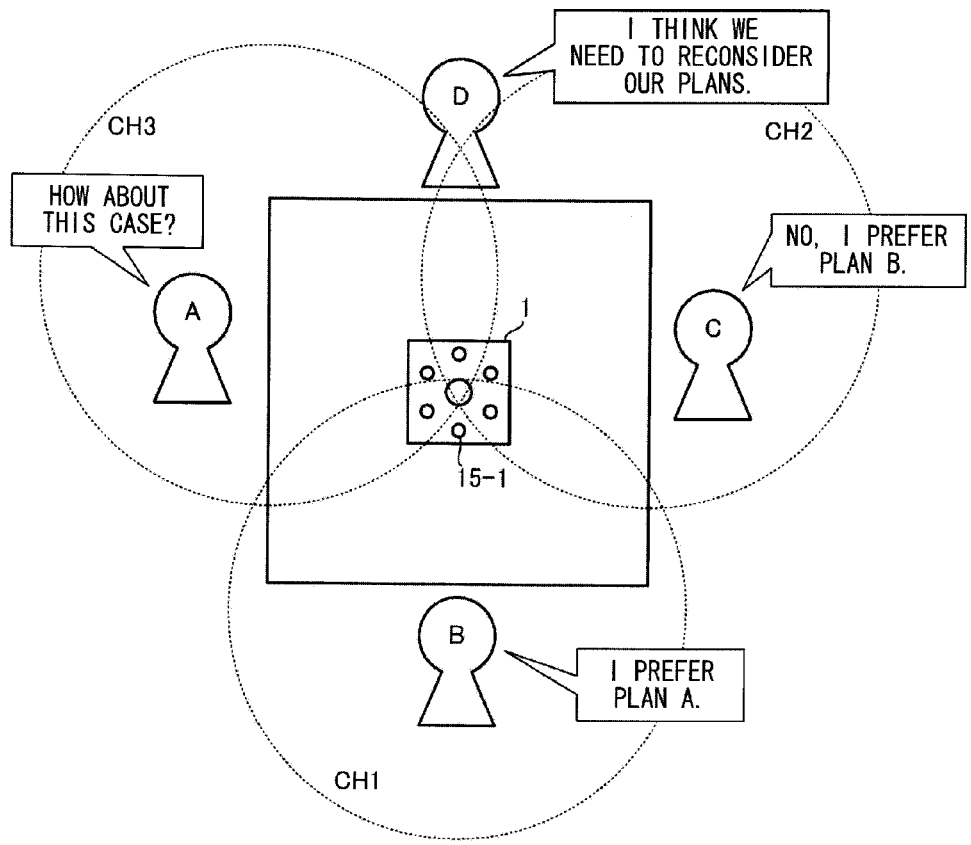
FIG. 4 An illustration showing a manner of recording the content of a meeting of four attendees by use of the recording/reproducing apparatus of Embodiment 1.
Figure 5:
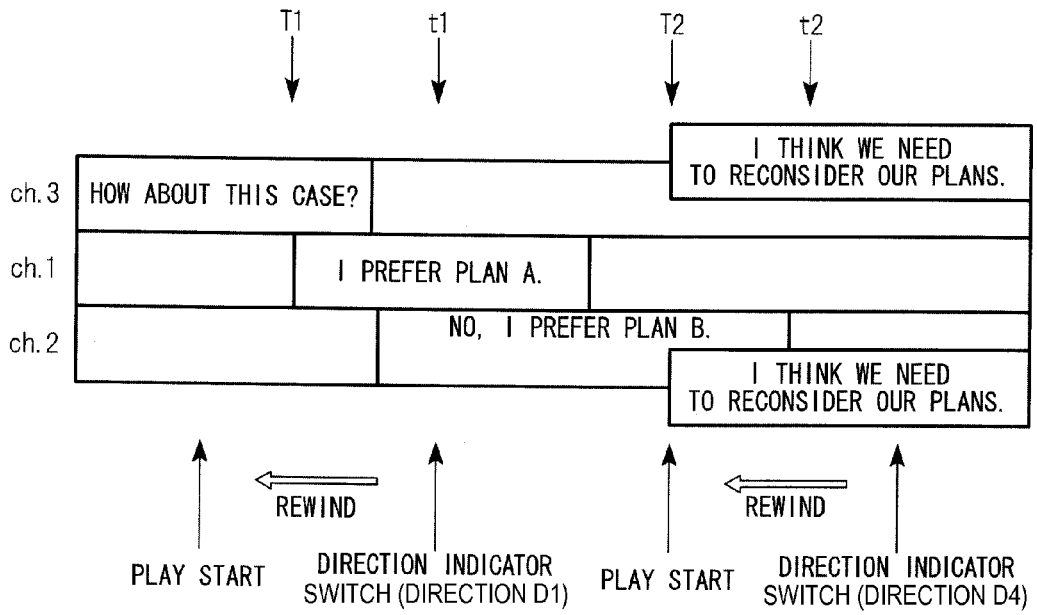
FIG. 5 An illustration showing the content of sounds of attendees of a meeting recorded on three channels in the recording/reproducing apparatus.

Next, an example in which the recording/reproducing apparatus 1 is adapted to an actual meeting will be described with reference to FIGS. 4 and 5. FIG. 4 shows the situation in which the recording/reproducing apparatus 1 is arranged at the center among four attendees A through D participated in a meeting so as to perform recording on the three channels CH1 through CH3; and FIG. 5 shows an example of sounds recorded on the three channels CH1 through CH3 of the recording unit 40.

As shown in FIG. 4, the recording/reproducing apparatus 1 is arranged on a conference table at which the four attendees A through D participating in a meeting are seated, wherein the front direction of the recording/reproducing apparatus 1 is directed to the attendee B. Specifically, the directivity characteristics of FIG. 2 are determined such that the attendee A is positioned in the direction D5; the attendee B is positioned in the direction D1; the attendee C is positioned in the direction D3; and the attendee D is positioned in the direction D4, wherein sound of the attendee A is recorded on the channel CH3; sound of the attendee B is recorded on the channel CH1; and sound of the attendee C is recorded on the channel CH2. In addition, the sound of the attendee D is recorded over the channels CH2 and CH3.

In response to the attendee A, who is presiding over a meeting and who asks a question of "How about this case?", the attendee B makes a statement of "I prefer Plan A"; the attendee C makes a statement of "No, I prefer Plan B"; and the attendee D makes a statement of "I think we need to reconsider our plans!". The attendees A through D make their statements without waiting for completion of a previous statement, so that FIG. 5 shows that the aforementioned statements are recorded in an overlapped manner in the recorded contents of the three channels CH1 through CH3.

In the normal reproducing mode of the recorded contents described above, all the statements of the attendees A through D are reproduced on the three channels CH1 through CH3 in accordance with the same condition, allowing the user to grasp the overall atmosphere of a meeting, whereas the statements of the attendees A through D are reproduced such that they are partially overlapped with each other. When the user operates the recording/reproducing apparatus 1 so as to change a reproducing state, for example, when the user operates the direction indicator switch 15-1 at time t1, the reproducing channel is switched over to the channel CH1 commensurate with the direction D1, so that only the sound of the attendee B seated in the direction D1 is selectively reproduced. In this case, the reproducing position of the recording/reproducing apparatus 1 is automatically rewound back to a time code T1 indicating a top position of the sound of the attendee B. This process allows the user to listen to the sound of an attendee, which the user would like to confirm, from its top position. In this connection, the top position of each sound can be detected based on tone-volume variations.

When the user operates the direction indicator switch 15-4 designating the direction D4 at time t2, the reproducing channel is switched over to the channels CH2 and CH3 commensurate with the direction D4, so that only the sound of the attendee D seated in the direction D4 is selectively reproduced. At this time, the reproducing position is rewound back to a time code T2 indicating the top position of the sound of the attendee D.

Figure 6:
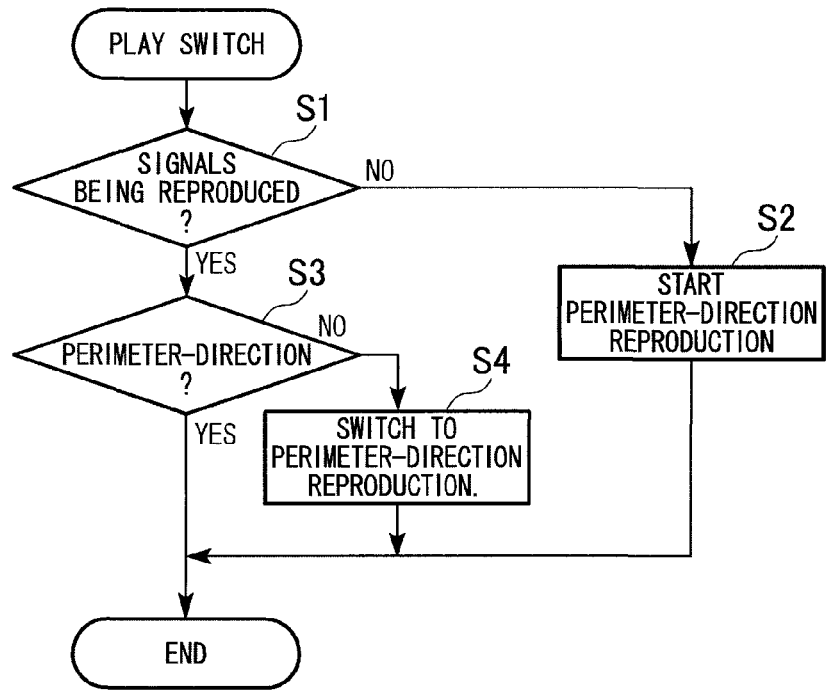
FIG. 6 A flowchart showing a reproduction process of a control unit of the recording/reproducing apparatus upon an operation of a play switch.
Figure 7:
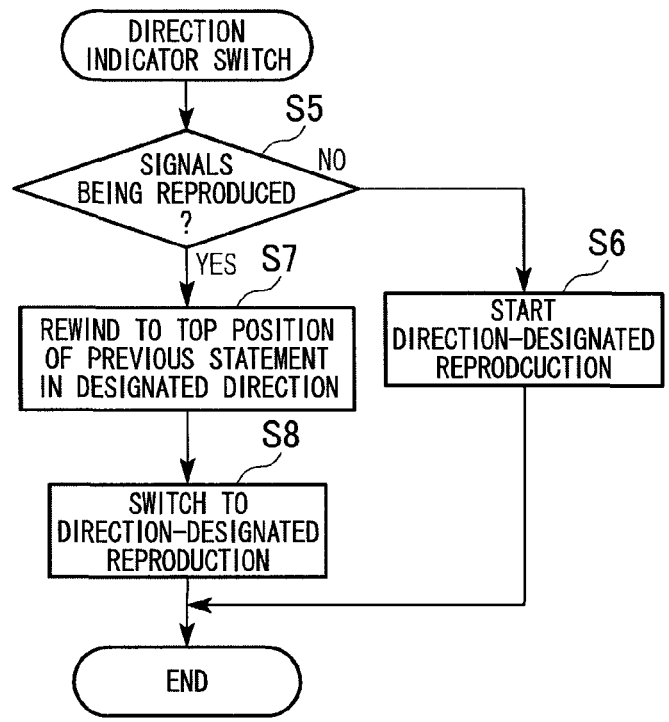
FIG. 7 A flowchart showing a reproduction process of the control unit of the recording/reproducing apparatus upon an operation of a direction indicator switch.

FIG. 6 is a flowchart showing a reproduction process of the control unit 20 of the recording/reproducing apparatus 1, which is initiated when the play switch is operated. FIG. 7 is a flowchart showing a reproduction process of the control unit 20 of the recording/reproducing apparatus 1, which is initiated when one of the direction indicator switches is operated. First, the user operates the play switch of the recording/reproducing apparatus 1 recording the statements of attendees in its stop mode, the control unit 20 makes a decision as to whether or not a reproducing operation is currently in progress (step S1). When the reproducing operation is not progressing (so that a decision result of step S1 is "NO"), a perimeter-direction reproducing operation serving as a normal mode is started (step S2). Specifically, the read unit 23 reads digital audio signals, recorded on the three channels CH1 through CH3, from the recoding unit 40 in parallel, so that read signals are supplied to the mixing unit 24. The mixing unit 24 mixes digital audio signals and supplies them to the D/A converter 32. The D/A converter 32 converts digital audio signals into analog audio signals, which are supplied to the audio amplifier 33. The audio amplifier 33 amplifies analog audio signals so as to supply them to the speaker 14. The speaker 14 produces sounds based on analog audio signals.

When the play switch is operated while the reproducing operation is progressing (so that a decision result of step S1 is "YES"), a decision is made as to whether the reproducing operation is a perimeter-direction reproducing operation of a normal mode or a reproducing operation dedicated to only the channel of the designated direction (step S3). In the case of the reproducing operation dedicated to only the channel of the designated direction (so that a decision result of step S3 is "NO"), the control unit 20 switches over to the perimeter-direction reproducing operation (step S4). On the other hand, when the play switch is operated while the perimeter-direction reproducing operation is progressing (so that a decision result of step S3 is "YES"), the flow shown in FIG. 6 is terminated without additional steps being performed.

When one of the direction indicator switches 15-1 through 15-6 is operated, the control unit 20 makes a decision as to whether or not the reproducing operation is currently progressing (step S5). When the reproducing operation is not progressing (so that a decision result of step S5 is "NO"), a reproducing operation is started on only the channel commensurate with the direction designated by the operated direction indicator switch (step S6). On the other hand, when any one of the direction indicator switches 15-1 through 15-6 is operated while the reproducing operation is progressing (so that a decision result of step S5 is "YES"), the control unit 20 searches for the top position of a previous statement made in the designated direction so as to rewind recorded sound (step S7); subsequently, it starts reproducing only the channel of the designated direction from the rewound position (step S8).

In this connection, when the user operates the play suspend switch, an audio reproduction is suspended at the currently reproduced position. Alternatively, when the user operates the play stop switch or terminates a recording/reproducing operation, the recording/reproducing apparatus 1 exits the reproduction processes shown in FIGS. 6 and 7.

Embodiment 2

Figure 8:
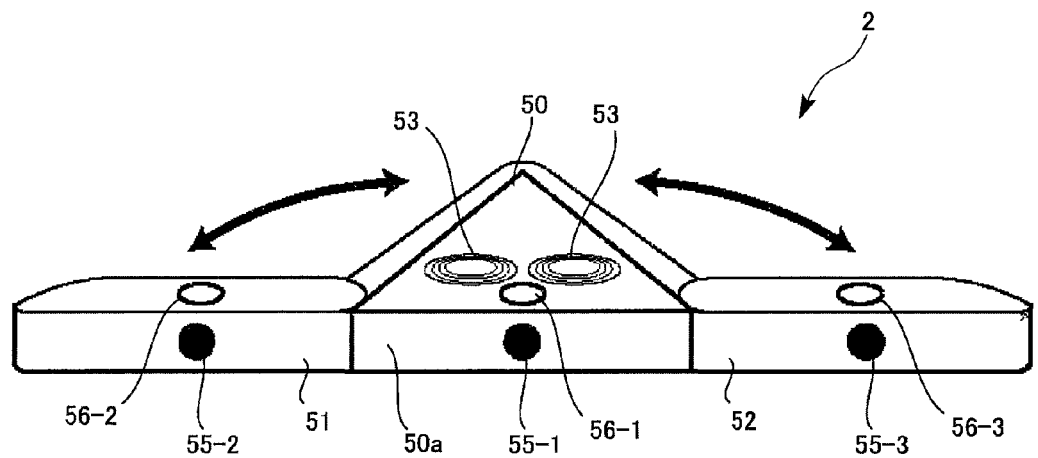
FIG. 8 A perspective view showing the exterior appearance of a recording/reproducing apparatus according to Embodiment 2 of the present invention in an arm-open state.
Figure 9:
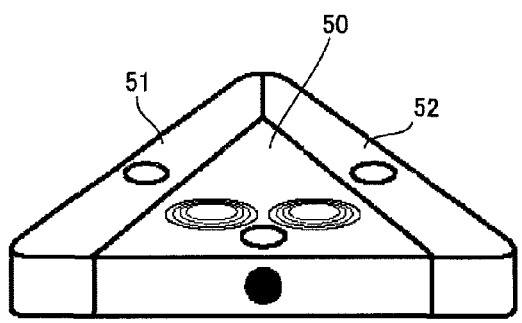
FIG. 9 A perspective view showing the exterior appearance of the recording/reproducing apparatus of Embodiment 2 in an arm-close state.

Next, a recording/reproducing apparatus 2 according to Embodiment 2 of the present invention will be described in detail. FIGS. 8 and 9 are perspective views showing the exterior appearances of the recording/reproducing apparatus 2 of Embodiment 2. In the recording/reproducing apparatus 2, open/close-adjustable arms 51, 52 are attached to the opposite sides of a housing 50 shaped in a triangular prism. FIG. 8 shows an open state in which the arms 51, 52 of the recording/reproducing apparatus 2 are opened; and FIG. 9 shows a closed state in which the arms 51, 52 of the recording/reproducing apparatus 2 are closed.

A unidirectional microphone 55-1 is attached to a front side face 50a among three side faces of the housing 50. In addition, a direction indicator switch 56-1 for designating the direction of the microphone 55-1 and speakers 53 are arranged on the upper surface of the housing 50.

The arms 51, 52 are attached to the opposite sides of the front side face 50a of the housing 50 via hinges (not shown) in a rotationally-adjustable manner. A unidirectional microphone 55-2 is attached to a side face of the arm 51, while a direction indicator switch 56-2 for designating the direction of the microphone 55-2 is arranged on the upper surface. A unidirectional microphone 55-3 is attached to a side face of the arm 52, while a direction indicator switch 56-3 for designating the direction of the microphone 55-3 is arranged on the upper surface.

Upon installing the recording/reproducing apparatus 2, the user is allowed to revolve the arms 51, 52 so that the three microphones 55-1 through 55-3 can be each directed in a desired direction. Angle sensors 41, 42 (see FIG. 10) are attached to the hinges supporting the arms 51, 52. In a recording mode of the recording/reproducing apparatus 2, audio signals picked up by the microphones 55-1 through 55-3 are recorded on the recording unit 40 whilst angles of the arms 51, 52 detected by the angle sensors 41, 42 are simultaneously recorded.

Figure 10:
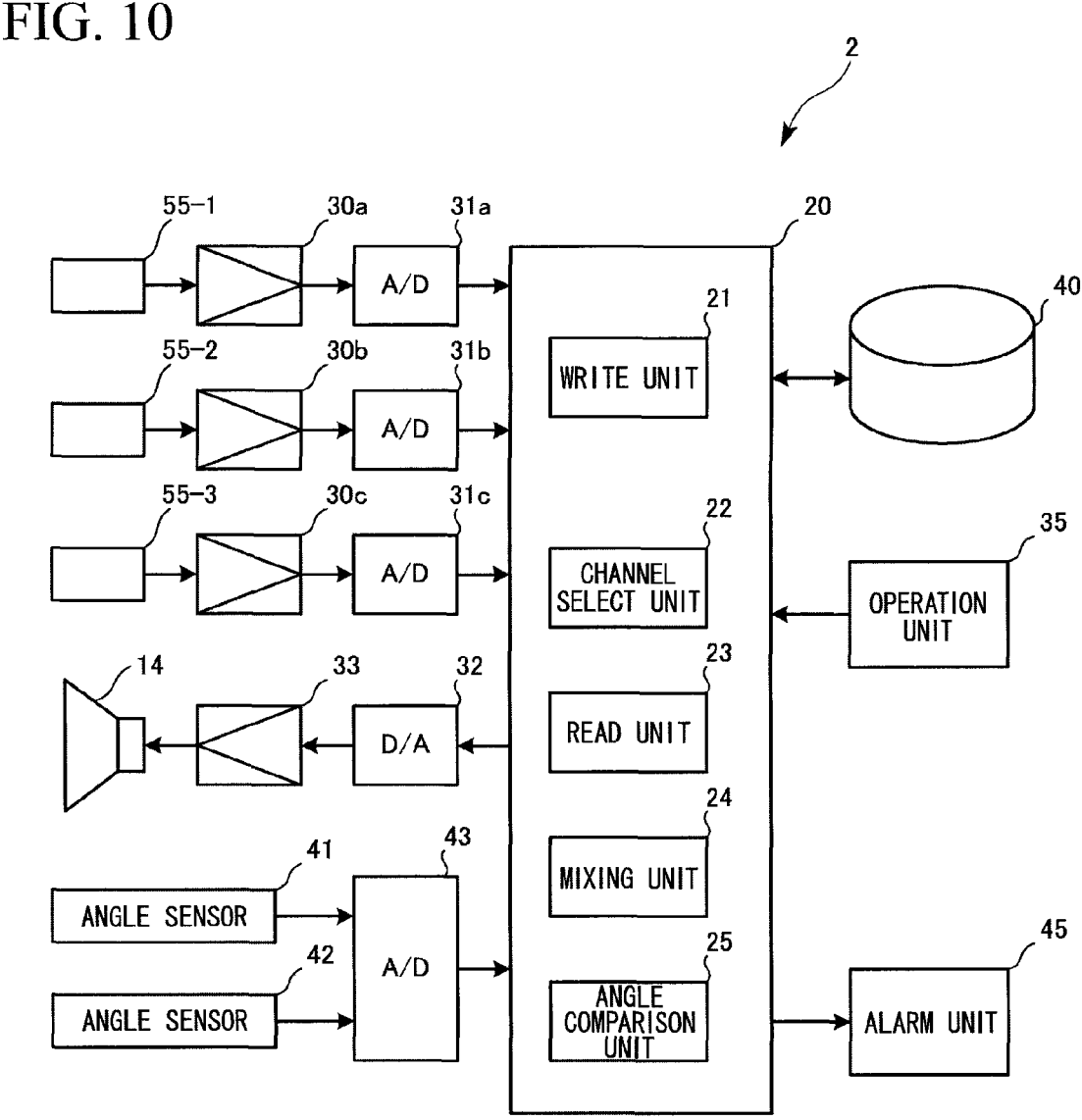
FIG. 10 A block diagram showing the constitution of the recording/reproducing apparatus of Embodiment 2.

FIG. 10 is a block diagram showing the constitution of the recording/reproducing apparatus 2, wherein the same parts as the constituent parts shown in FIG. 2 are designated by the same reference numerals; hence, the description thereof is omitted. The recording/reproducing apparatus 2 of Embodiment 2 differs from the recording/reproducing apparatus 1 in the following points.

1. The angle sensors 41, 42 are facilitated, and an A/D converter 43 is arranged to convert the detected angles into digital data.
2. Digital data representing the detected angles of the angle sensors 41, 42 are provided to the control unit 20.
3. An angle comparison unit 25 is newly installed in the control unit 20.
4. An alarm unit 45 is newly installed and connected to the control unit 20.

When the user operates the play switch, the angle comparison unit 25 compares the detected angles of the angle sensors 41, 42 (i.e. recording-mode angles) recorded on the recording unit 40 with the angles currently detected by the angle sensors 41, 42 (i.e. reproducing-mode angles). When the recording-mode angles agree with the reproducing-mode angles, the control unit 20 starts a sound reproducing operation. When the recording-mode angles disagree with the reproducing-mode angles, the control unit 20 drives the alarm unit 45 so as to produce alarm sound, thus requesting the user to change the angles of the arms 51, 52. The alarm sound is produced when the reproducing-mode angle of the arm 51 is smaller/larger than the recording-mode angle and when the reproducing-mode angle of the arm 52 is smaller/larger than the recording-mode angle.

Figure 11:
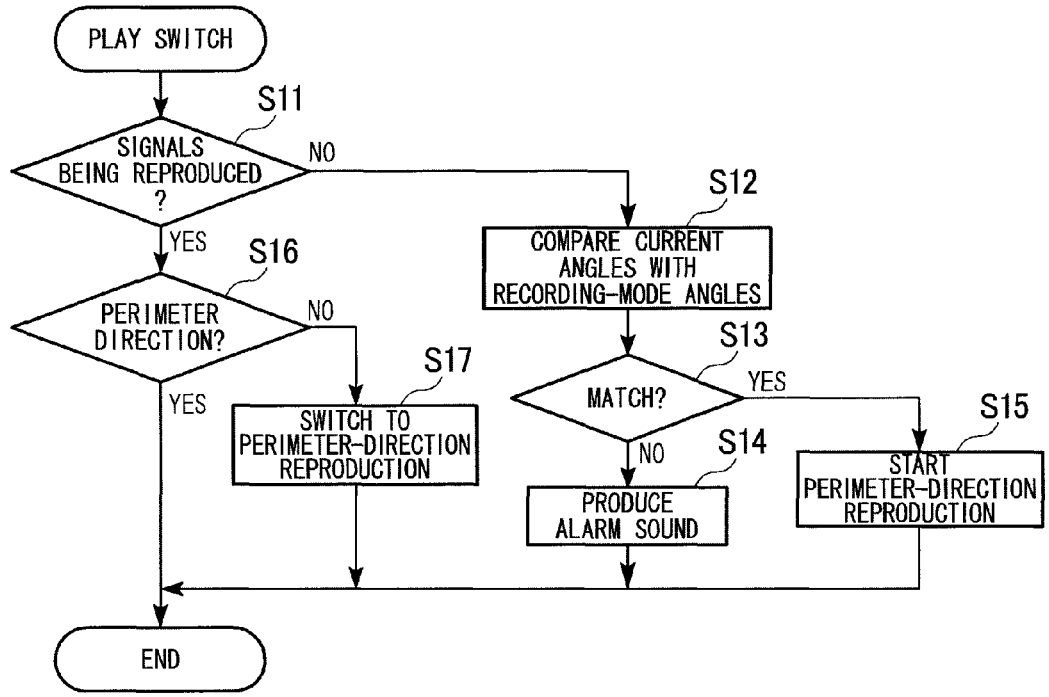
FIG. 11 A flowchart showing a reproduction process of a control unit of the recording/reproducing apparatus upon an operation of a play switch.
Figure 12:
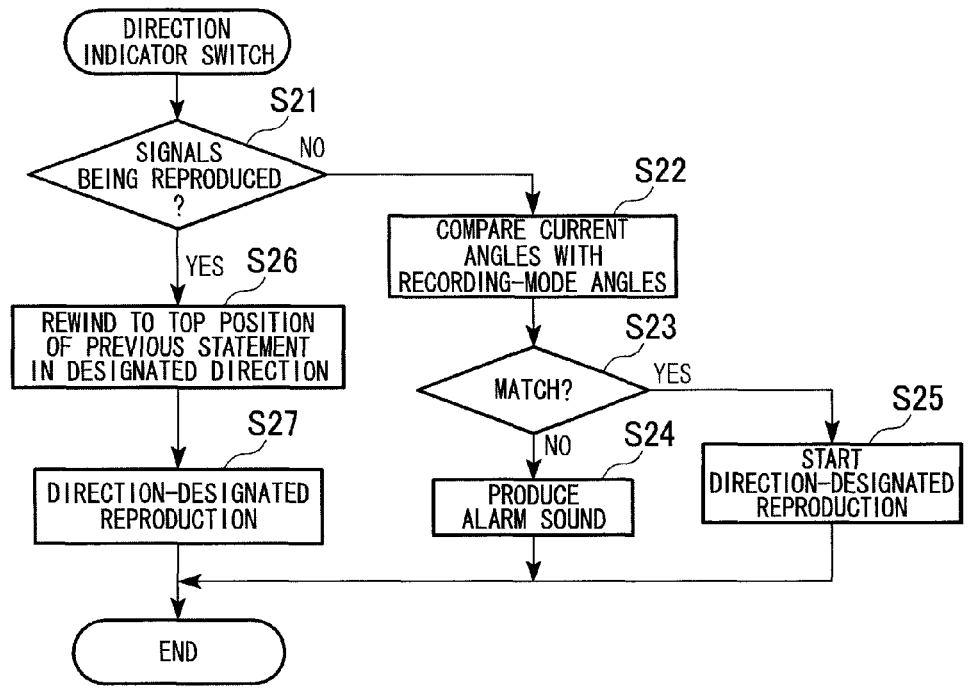
FIG. 12 A flowchart showing a reproduction process of the control unit of the recording/reproducing apparatus upon an operation of a direction indicator switch.

FIG. 11 is a flowchart showing a reproduction process of the control unit 20 of the recording/reproducing apparatus 2 when the play switch is operated. FIG. 12 is a flowchart showing a reproduction process of the control unit 20 of the recording/reproducing apparatus 2 when any one of the direction indicator switches is operated. First, when the user operates the play switch in a stop mode of the recording/reproducing apparatus 2, the control unit 20 makes a decision as to whether or not the reproducing operation is currently progressing (step S11). When the reproducing operation is not progressing (so that a decision result of step S11 is "NO"), the control unit 20 reads angles currently detected by the angle sensors 41, 42 (i.e. current angles); the angle comparison unit 25 compares the current angles with the recording-mode angles recorded on the recording unit 40 (step S12), thus making a decision as to whether or not they match each other (step S13). When the current angles agree with the recording-mode angles (so that a decision result of step S13 is "YES"), the control unit 20 starts a perimeter-direction reproducing operation of a normal mode (step S15). When they disagree with each other (so that a decision result of step S13 is "NO"), the control unit 20 drives the alarm unit 45 so as to produce alarm sound, thus requesting the user to change the angles of the arms 51, 52 (step S14). Thereafter, the control unit 20 exits the flow of FIG. 11 without starting a reproducing operation.

When the play switch is operated while the reproducing operation is progressing (so that a decision result of step S11 is "YES"), the control unit 20 makes a decision as to whether the reproducing operation is a perimeter-direction reproducing operation of a normal mode or a decision as to whether it is a reproducing operation dedicated to only the channel of the designated direction (step S16). In the case of the reproducing operation dedicated to only the channel of the designated direction (in which a decision result of step S16 is "NO"), the control unit 20 switches to the perimeter-direction reproducing operation (step S17). In the case of the perimeter-direction reproducing operation (in which a decision result of step S16 is "YES"), the control unit 20 exits the flow of FIG. 11 without additional steps being performed.

When one of the direction indicator switches 56-1 through 56-3 is operated, the control unit 20 makes a decision as to whether or not the reproducing operation is currently progressing (step S21). When the reproducing operation is not currently progressing (so that a decision result of step S21 is "NO"), the control unit 20 reads current angles from the angle sensors 41, 42 so as to compare them with the recording-mode angles recorded on the recording unit 40 (step S22), thus making a decision as to whether or not they match each other (step S23). When they agree with each other (so that a decision result of step S23 is "YES"), the control unit 20 starts a reproducing operation using only the channel laid in the direction designated by the operated direction indicator switch (step S25). When they disagree with each other (so that a decision result of step S23 is "NO"), the control unit 20 drives the alarm unit 45 to produce alarm sound, thus requesting the user to change the angles of the arms 51, 52 (step S24). Thereafter, the control unit 20 exits the flow of FIG. 12 without starting a reproducing operation.

When any one of direction indicator switches is operated while the reproducing operation is progressing (so that a decision result of step S21 is "YES"), the control unit 20 searches for a top position of a previous statement made in the designated direction so as to rewind the recorded contents (step S26); subsequently, it starts reproducing only the channel of the designated direction from the rewound position (step S27).

Similar to Embodiment 1 (see FIGS. 6 and 7), when the user operates the play suspend switch, the sound reproduction is suspended at the currently reproducing position. When the user operates the play stop switch or when the recording/reproducing operation is terminated, the recording/reproducing apparatus 2 terminates the reproduction processes shown in FIGS. 11 and 12.

As described above, the recording/reproducing apparatus 2 of Embodiment 2 is designed to perform sound reproduction with the same installation position as the recording mode; this allows the user to select the direction for the sound reproduction based on the seating order of attendees in the recording mode. In other words, it is unnecessary to establish the positional relationship between recording channels and attendees in a meeting, wherein the user is able to easily select recording channels for attendees in a meeting.

Embodiment 1 and Embodiment 2 are described with respect to the recording/reproducing operations of statements of attendees in a meeting, wherein the recording/reproducing apparatus of the present invention can be applied to fields other than sound recording/reproducing operations of minutes of meetings.

In addition, the sound collection unit of Embodiment 1 and Embodiment 2 are constituted using unidirectional microphones; but this is not a restriction. For example, the sound collection unit of the recording/reproducing apparatus can be embodied using a plurality of sound-collection beams collected in a microphone array disclosed in Patent Document 2.

INDUSTRIAL APPLICABILITY

The present invention provides a recording/reproducing apparatus having a fixed sound-collection directivity or a movable sound-collection directivity; hence, the present invention can be applied to a broad range of recording/reproducing fields adapted to meetings, discussions, in-house deliberations, which are each constituted of a plurality of attendees' statements.

DESCRIPTION OF THE REFERENCE NUMERALS 1, 2 Recording/reproducing apparatus
10, 50 Housing
11 Sound collector
12, 55 Microphone
14, 53 Speaker
15, 56 Direction indicator switch
51, 52 Arm
20 Control unit
40 Recording unit

The invention claimed is:

1. A recording/reproducing apparatus comprising:
a plurality of unidirectional microphones;
a storage device;
a plurality of direction indicator switches operable by at least one user arranged in relation to the plurality of unidirectional microphones so that each of the switches is associated with a designated directivity of at least one microphone among the plurality of microphones; and
a microprocessor programmed to execute:
a recording task of recording a plurality of audio signals picked up by the plurality of unidirectional microphones in parallel and storing the recorded audio signals in the storage device; and
a reproduction task that:
if no indicator switch is operated by a user, reads and reproduces the plurality of audio signals stored in the storage device in parallel; and
upon one of the direction indicator switches being operated by a user during reproduction of the plurality of audio signals in parallel, selectively reads and reproduces only the audio signal, from the start thereof, emitted in the designated directivity associated with the one direction indicator switch.

2. The recording/reproducing apparatus according to claim 1, wherein:
the plurality of unidirectional microphones are disposed with a predetermined angle interval therebetween, and
when no unidirectional microphone among the unidirectional microphones is disposed in the direction designated by the one direction indicator switch, the reproduction task reads and mixes a plurality of audio signals picked up by a plurality of unidirectional microphones that are disposed sandwiching the designated direction.

3. A recording/reproducing apparatus comprising:
a housing;
at least one arm rotatably connected to the housing;
a plurality of unidirectional microphones attached to the housing and the arm;
a storage device;
a plurality of direction indicator switches operable by at least one user attached to the housing and the arm and arranged in relation to the plurality of unidirectional microphones so that each of the switches is associated with a designated directivity of at least one microphone among the plurality of microphones; and
a microprocessor programmed to execute:
a recording task of recording a plurality of audio signals picked up by the plurality of unidirectional microphones in parallel and storing the recorded audio signals in the storage device; and
a reproduction task that:
if no indicator switch is operated by a user, reads and reproduces the plurality of audio signals stored in the storage device in parallel in a normal reproducing mode; and
upon one of the direction indicator switches being operated by a user during reproduction of the plurality of audio signals in parallel, selectively reads and reproduces only the audio signal, from the start thereof, emitted in the designated directivity associated with the one direction indicator switch in a selective reproducing mode.

4. The recording/reproducing apparatus according to claim 3, wherein:
the plurality of unidirectional microphones are disposed with a predetermined angle interval therebetween, and
when no unidirectional microphone, among the unidirectional microphones, is disposed in the direction designated by the one direction indicator switch, the reproduction task reads and mixes a plurality of audio signals picked up by a plurality of unidirectional microphones that are disposed sandwiching the designated direction.

* * * * *